Jan. 2, 1934.                M. FINOCCHIARO                1,942,279
                                 AIRPLANE
                          Filed March 16, 1932
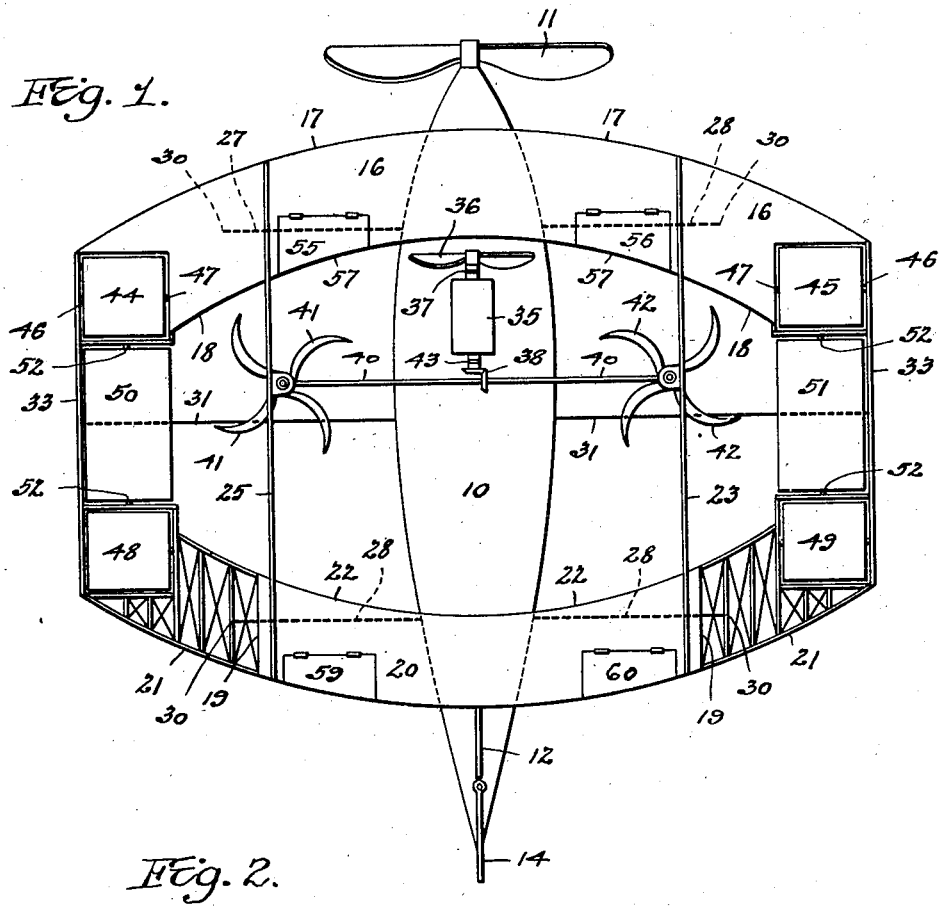
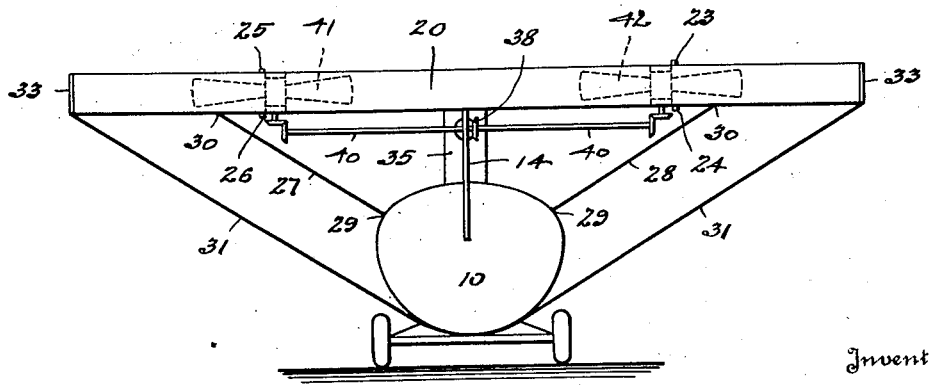
Inventor
MARIANO FINOCCHIARO
By H. H. Snelling
Attorney Patented Jan. 2, 1934

1,942,279

UNITED STATES PATENT OFFICE 1,942,279

AIRPLANE

Mariano Finocchiaro, Bellevue, Del.

Application March 16, 1932. Serial No. 599,313

14 Claims. (Cl. 244—12)

This invention relates to airplanes and particularly to one which may carry lifting devices in order to allow it to rise from the ground in a nearly vertical direction and has for its principal object the conformation of main wing in bow shape preferably tho not necessarily having the forward and rearward margins arcuate or nearly so.

An important feature of the invention consists in the provision of shutter-like controls to modify the vertical movement of the airplane when ascending or descending primarily by means of its helicopter lifting devices.

The ordinary airplane carries no helicopter wings altho many devices have been suggested calling for the combination of advancing and lifting propellers but as far as I know only one model has had any reasonable commercial success doubtless due largely to the improper placing of the helicopter propellers. It is my intention to combine the normal advancing propeller or propellers with a pair of opposed lifting propellers which I space behind the main wing but in the same horizontal plane so that these lifting propellers will have minimum resistance when the airplane is flying forward under its main advancing propeller.

Where an airplane having helicopter propellers is descending it is not possible with the heretofore known devices to control to a nicety the landing spot after once the decision to land has been made, in other words while some pilots can land an autogiro type of airplane remarkably close to a chosen spot they do not have the power of altering their course when near the ground and it is to provide such control that I have added at the side of my airplane a plurality of controls, two, one on each side to shift the entire device laterally when ascending or descending and others, preferably four in number, to control longitudinal shifting of the airplane when descending by the helicopter propellers. While it might seem that the normal ailerons of the airplane could control forward movement, they clearly cannot control rearward movement at all and I, therefore, much prefer to arrange for both forward and rearward movement of the airplane in ascending and descending by means of the shutter-like controls shown in the drawing since these must be provided in any event to secure rearward movement and it is simpler to use them for both forward and rearward movement, leaving the ailerons for their normal and well known functions.

A further object of the invention consists in the positioning of an auxiliary advancing propeller above the fuselage and adapted to be clutched to the helicopter driven motor when desired, thus enabling me to use such motor positioned above the fuselage to drive the helicopter propellers when ascending and at will to connect this same motor to drive a small auxiliary advancing propeller thus initiating the chosen direction of flight and when the elevation is sufficient the motor can continue to drive the auxiliary advancing propeller and be disconnected from the two or more lifting propellers.

In the drawing:

Figure 1 is a plan view of one embodiment of my invention.

Figure 2 is a rear elevation.

The fuselage 10 is of modern shape and I much prefer to use a single fuselage as illustrated rather than to have two or more as has frequently been suggested and actually used. In a device such as I have illustrated I find that I can secure somewhat greater strength and relative lightness by using the single fuselage shown. At the forward end of the fuselage 10 I mount the main advancing propeller 11 driven in usual fashion by a prime mover located in accordance with preferred practice inside of the forward end of the fuselage and therefore not shown in the drawing, its specific form and location having no bearing upon the present invention. At the rear of the fuselage is a stabilizer 12 and rudder 14, these elements being well known and old.

The main wing 16 differs from normal practice in that its forward edge 17 is curved and is symmetrical with respect to the longitudinal center line of the device. While the curve 17 may be elliptical I prefer that the foci of the ellipse shall be relatively close together so that the curve 17 shall approximate an arc. The rear edge 18 of the main wing is curved in the same manner as the forward edge 17 and is substantially parallel to the forward curve altho I prefer that the radial depth of the wing shall increase slightly from the center outward.

The rear wing 20 has a rear curved edge 21 preferably a portion of the curve of an ellipse approximating an arc and the forward concave edge 22 in my preferred embodiment is of the same shape as the rear curved edge 18 of the main wing. While the radial depths of the two wings may be the same, I prefer that the depth from front to back of the main wing at any point shall be slightly greater than the corresponding depth of the rear or auxiliary wing 20.

The two wings, while spaced quite far apart, as seen in the drawing are very rigidly secured together and have a strong cooperating function making the airplane much more steady in flight which naturally reduces materially the ability to maneuver rapidly but it should be understood that this plane is not intended for battle purposes but is intended for passenger service and I have therefore sacrificed speed and the ability to do stunt flying to increased safety and smoothness of action. The main wing is entirely covered with the usual fabric and generally I shall also cover the entire surface of the rear or auxiliary wing but under certain circumstances I end the fabric cover of the auxiliary wing at a line such as 19 leaving the outside of the auxiliary wing bare. In this way I secure less effect of the rear auxiliary wing which at times may be desirable.

It is my preference that the means for connecting together rigidly the two wings shall include four longitudinal rods 23, 24, 25 and 26 arranged in bars passing close to the vertical axes of the helicopter propellers if not directly over them, allowing these longitudinal rods to support the shafts of these propellers if so desired. The two wings as a unit are also very rigidly secured to the fuselage, for example, by the struts 27 and 28 extending from a point such as 29 at the side of the fuselage to a point such as 30 somewhat inside of the line of the longitudinal and lateral controls which are at each side of the airplane. The bottom rods 31 I prefer to extend from the extreme bottom of the fuselage 10 to the center of the side beam 33 which extends from the outside corner of the front edge 17 of the outside edge of the rear curve 21 of the auxiliary wing.

The motor 35 mounted directly above the fuselage somewhat forward of the center drives the auxiliary advancing propeller 36 which may be disconnected therefrom by the clutch 37 and also drives thru the gearing 38 the lateral main shaft 40 which drives the opposed helicopter or lifting propellers 41 and 42. This drive is also provided with a clutch 43 so that the entire power of the motor 35 can be utilized by the auxiliary advancing propeller 36 or by the lifting propellers or may be divided between the two. While the lifting propellers can cause the airplane to rise vertically, it frequently happens that it is desirable to shift the position of the device laterally while ascending. While a forward movement could be secured by clutching in the auxiliary propeller 36, I prefer not to do this while first rising and I, therefore, secure such a movement by tilting the lateral controls 44 and 45 each mounted upon laterally extending trunnions 46 journaled in the proximate side bar 33 and similar trunnions 47 journaled in the main wing. While two of these longitudinal controls would be sufficient I find it much more convenient to reduce the size of each individual longitudinal control while keeping the same total area and for this reason I much prefer to have these controls four in number, the rear controls 48 and 49 being identical with the forward longitudinal controls 44 and 45 and are preferably connected to operate with them.

A more important control is that by means of which lateral shifting is provided for and this means in my preferred embodiment includes a pair of shutters or lateral controls 50 and 51 mounted on longitudinal trunnions 52. It is my preference that all six of the controls be of the same top to bottom thickness so as to preserve a smooth surface. While a very slight saving in weight might possibly be had by making the lateral controls 50 and 51 much thinner the loss of streamline effect would more than compensate for the saving in weight and I therefore prefer that the lateral control vanes shall, like the four longitudinal control vanes, be of the same depth or thickness from top to botom as are the two wings.

The two ailerons 55 and 56 in the main wing are preferably hinged to turn about a lateral axis which I much prefer to be at right angles to the center line of the fuselage altho this may be tilted very slightly without material effect. The rear curve 57 of these ailerons is a continuance of the curve 18. In the rear wing I provide a second pair of ailerons 59 and 60 which, while not essential, aid in the smooth flying of the machine and I prefer to have them and to curve their rear edges to conform with the arc or curve 21 of the rear edge of the auxiliary wing 20.

In operation the airplane rises from the ground by means of the two opposed helicopter propellers 41 and 42 driven by the motor 35. When a sufficient height has been achieved the auxiliary advancing propeller 36 is clutched in and is driven by the motor 35 while the lifting propellers are still in use, this giving the desired forward direction to the craft. At such time or slightly after, the main motor (not shown) is put in operation and the airplane is therefore driven by the main propeller 18 with or without the use of the auxiliary advancing propeller 36 which, however, I prefer generally to use. In descending the main or auxiliary advancing propellers idle and the rapidity of the descent is controlled by movement of the helicopter propellers 41 and 42. Should there be a cross wind or should any other cause indicate a change in the direction of the aircraft this can readily be secured by proper manipulation of either or both the lateral control shutters 51 and 52 and the four longitudinal control shutters 44, 45, 48 and 49. Since these two groups of control shutters are independently operated any desired direction of change of flight can be secured by them while descending hence it is possible to land in an extremely small designated spot.

What I claim is:

1. An airplane having a wing the front edge of which is convex and symmetrical with respect to the longitudinal center line of the plane and substantially arcuate, the rear edge of the wing is approximately parallel to the front edge, and the front to rear depth of the wing constantly increases outwardly from the longitudinal center line toward the tips of the wings.

2. In an airplane, a fuselage, two wings connected to the fuselage in spaced tandem relation, the lateral centerline of the front wing being bowed rearwardly toward the rear wing and means for rigidly connecting the adjacent tips of the wings in spaced front to back relation.

3. The device of claim 2 in which the wing tip connecting means consists of two frames, a vane is mounted in each frame, and including means for turning each vane about an axis parallel to the axis of the fuselage.

4. In an airplane, a fuselage, two wings connected to the fuselage and arranged in spaced tandem relation, the end portions of the front and rear wings being curved toward each other, means for connecting the adjacent ends of the front and rear wings, and vanes mounted within said means, adapted to turn about horizontal axes parallel to the longitudinal axis of the fuselage.

5. The device of claim 2 in which means are provided for connecting the adjacent ends of the front and rear wings, said means including vanes adapted to turn about their respective central axes, said axes being parallel to the longitudinal axis of the fuselage.

6. In an airplane, a fuselage, two wings connected to the fuselage and arranged in spaced tandem relation, the end portions of the front and rear wings being curved toward each other, means for connecting the adjacent ends of the front and rear wings, and a pair of lifting propellers one on each side of the fuselage and between the front and rear wings.

7. In an airplane, a fuselage, a curved wing mounted above the fuselage the center of curvature being behind the wing, a second curved wing mounted above the fuselage in the same plane as the first mentioned wing but spaced to the rear thereof and having its center of curvature in front of the second wing, the ends of the front wing being connected to the ends of the rear wing, the area of the front wing being greater than that of the rear wing.

8. In an airplane, a fuselage, two pairs of oppositely curved wings above and connected to the fuselage in spaced tandem relation and to each other at their ends, a helicopter propeller mounted on each side of the fuselage between each front and rear wing and at the level of the wings, the spread of the propellers being not greater than the distance between the wings, said propellers being spaced laterally of the fuselage whereby the streams of air created thereby do not strike either the wings or the fuselage.

9. The device of claim 8 in which two vanes are mounted between the ends of the front and rear wings, two of said vanes being mounted to turn about axes parallel to the longitudinal axis of the fuselage and the other two being mounted to turn about axes normal to said longitudinal axis.

10. In an airplane, a fuselage, front and rear wings connected in tandem relation, the wing spreads being equal but the area of the front wing being greater than that of the rear wing, the front wing being curved rearwardly and the rear wing being curved forwardly whereby the ends of the wings approach each other, and means for connecting said ends together.

11. In an airplane, a fuselage, a wing member connected to the forward part of said fuselage, said wing being curved rearwardly toward each end from the center, a curved frame connecting the end of the fuselage to each wing end, said frame being covered at the middle portion to form a wing surface and a pair of ailerons in said frame and normally lying in said surface.

12. The device of claim 11 in which four normally horizontal vanes are provided, a pair of said vanes being connected between one wing end and the frame and a pair between the other wing end and the frame, one of each pair being mounted to turn about a longitudinal axis and the other of each pair being mounted to turn about a lateral axis, said vanes being independently adjustable.

13. The device of claim 11 in which a helicopter propeller is mounted on each side of the fuselage to turn in the spaces between the wing and the frame and in the plane of the wing, and independently movable vanes mounted at the ends of the wings and adapted to turn about axes parallel to the fuselage.

14. In an airplane, a pair of oppositely curved wings connected in spaced tandem relation in substantially the same plane, the forward edge of the front wing and the trailing edge of the rear wing substantially forming the major arcs of an ellipse and helicopters mounted in the space between the two wings but nearer the front wing than the rear wing whereby the balance of the machine is maintained when descending and ascending.

MARIANO FINOCCHIARO.